(12) United States Patent
Sanpei et al.

(10) Patent No.: US 6,660,213 B1
(45) Date of Patent: Dec. 9, 2003

(54) NOZZLE PLATE MANUFACTURING METHOD

(75) Inventors: Kouichi Sanpei, Kawasaki (JP); Masayuki Sasaki, Kawasaki (JP); Hiromitsu Soneda, Kawasaki (JP); Mutsuo Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/241,629

(22) Filed: Feb. 2, 1999

(30) Foreign Application Priority Data

Jul. 27, 1998 (JP) .......................... 10-211428

(51) Int. Cl.$^7$ .................. B24C 1/00; B23K 26/00; B29C 67/00; B26F 1/26
(52) U.S. Cl. .................. 264/504; 264/400; 264/156; 219/121.71; 219/121.72; 219/121.85
(58) Field of Search ................ 264/400, 139, 264/156, 504; 219/121.7, 121.71, 121.72, 121.85; 347/45, 47

(56) References Cited

U.S. PATENT DOCUMENTS

| 5,012,066 A | * | 4/1991 | Matsutani et al. ..... 219/121.68 |
| 5,502,470 A | * | 3/1996 | Miyashita et al. ............. 347/45 |
| 5,653,901 A | * | 8/1997 | Yoshimura ............. 219/121.71 |
| 5,682,187 A | * | 10/1997 | Watanabe et al. ............. 347/45 |
| 5,757,482 A | * | 5/1998 | Fuchs et al. ................. 356/246 |
| 5,905,515 A | * | 5/1999 | Yoshimura ................... 347/45 |

FOREIGN PATENT DOCUMENTS

| EP | 0 576 007 A2 | * 12/1993 |
| JP | 62-202743 | 9/1987 |
| JP | 06-171081 | * 6/1994 |
| JP | 7-52392 | 2/1995 |
| JP | 07-89079 | * 4/1995 |
| JP | 7-101064 | 4/1995 |
| JP | 7-108683 | 4/1995 |
| JP | 8-318628 | 12/1996 |
| JP | 09-137286 | * 5/1997 |
| JP | 9-193403 | 7/1997 |

* cited by examiner

Primary Examiner—Stefan Staicovici
(74) Attorney, Agent, or Firm—Armstrong, Kratz, Quintos, Hanson & Brooks, LLP

(57) ABSTRACT

A nozzle plate to be mounted on an ink jet print head includes a plate body on which is formed a plurality of jet aperture portions from which ink is jetted and a water-repellant film formed on this plate body. The diameter of jet aperture portions formed on the plate body and the diameter of water-repellant film apertures formed on the water-repellant film so as to connect with the nozzle apertures are the same diameter R3, so the ink jet flow can be accurately controlled.

3 Claims, 7 Drawing Sheets

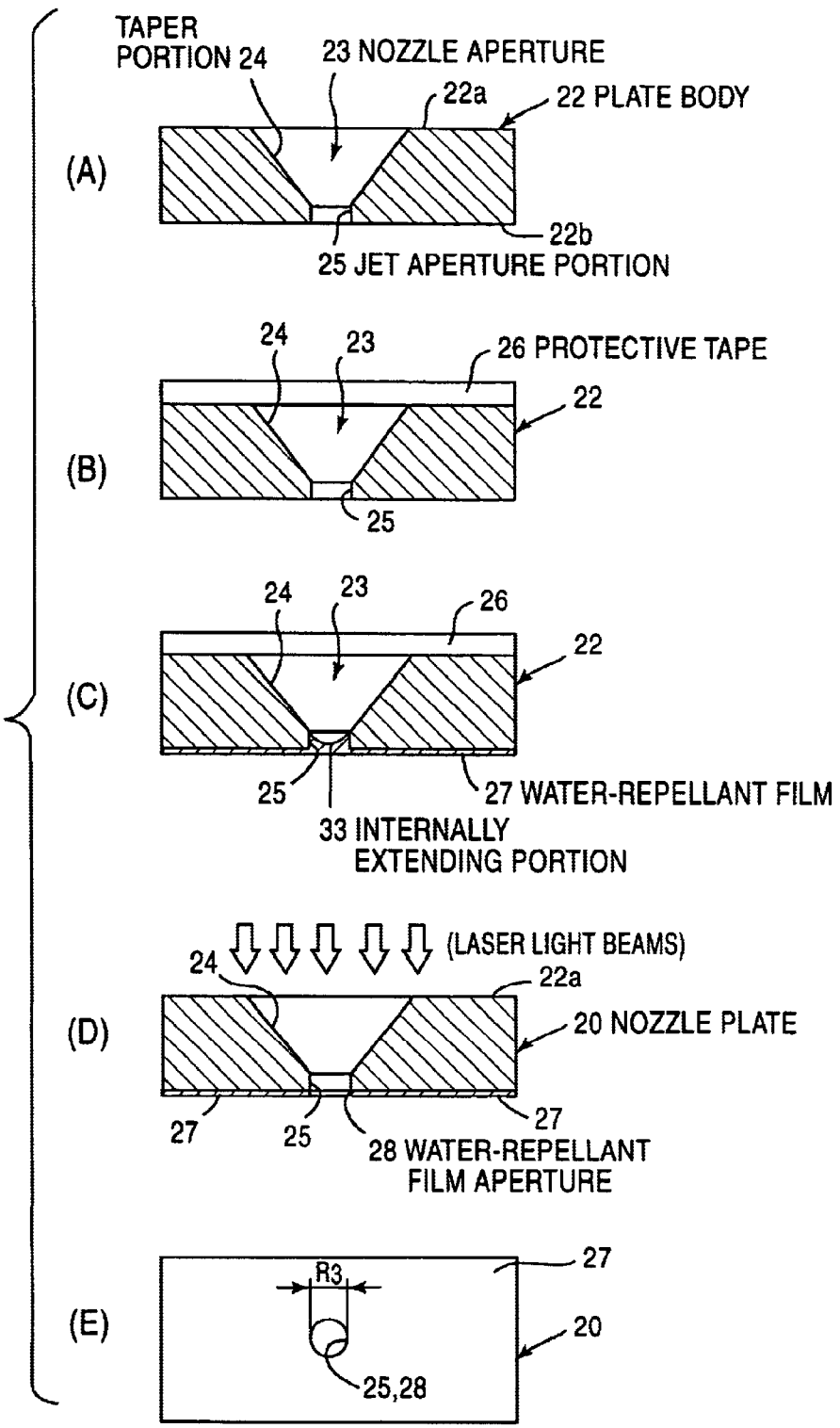

NOZZLE PLATE MANUFACTURING METHOD

BACKGROUND OF THE INVENTION

1. Field of the Invention

The present invention generally relates to a nozzle plate and a nozzle plate manufacturing method, and more particularly to a nozzle plate to be mounted on an ink jet print head and a manufacturing method therefor.

2. Description of the Related Art

Generally, an ink jet print head for printing alphanumeric characters on recording paper by jetting ink has a nozzle plate (a metal plate) on which a plurality of nozzle apertures from which ink is jetted are formed.

The nozzle plate is hydrophilic with respect to the ink when only a nozzle plate is used. Thus, a water-repellant film is formed on the surface of the nozzle plate, in the interest of improving the performance of the print head by improving the flow of the ink when jetted. This water-repellant film affects the ink jet and therefore must be formed in a condition appropriate for jetting ink.

FIG. 1 and FIG. 2 show examples of a conventional nozzle plate manufacturing methods according to the steps by which each is manufactured. The individual manufacturing methods shown in FIG. 1 and FIG. 2 are basically the same, so an explanation will first be given of the basic method for manufacturing a nozzle plate as shown in FIG. 1.

FIG. 1(A) shows a plate body 2 which forms the nozzle plate 1. This plate body 2 is made for example of stainless steel (SUS) and, as the same drawing shows, a nozzle aperture 3 is previously formed on the plate body 2 by a mechanical process or an etching process. This nozzle aperture 3 is composed of a slanted taper portion 4 and a jet aperture portion 5 from which ink is jetted to the outside.

As shown in FIG. 1(B), the plate body 2 so composed is filled with a resist material 6 (the resist material deposition process). At this time, the resist material 6 is loaded from the taper portion 4 of the plate body 2 and the nozzle 3 is filled with the resist material 6.

The process of depositing the resist material deposits the resist material 6 inside the nozzle aperture 3 and, as shown in FIG. 1(C), a water-repellant film 7 is formed on the surface of the plate body 2 (the surface of the side on which the jet aperture portion 5 is formed) (the water-repellant film formation process). This water-repellant film formation process forms the water-repellant film 7 using a method of applying, for example, a composite plating made of a fluororesin material dispersed over a metal such as nickel, or a thin coating of water-repellant resin material.

The material selected as the water-repellant film 7 is such that it forms a good connection with the plate body 2 but a poor connection with the resist material 6. Therefore, the water-repellant film 7 is formed in locations where the resist material 6 is not deposited. That is, an aperture is formed in the water-repellant film 7 (hereinafter referred to as the water-repellant film aperture 8).

Forming the water-repellant film 7 by the water-repellant film formation process described above and then removing the resist material 6 (the resist material removal process) completes the nozzle plate 1 shown in FIG. 1(D) and FIG. 1(E), in which the plate body 2 is coated with the water-repellant film 7. In this completed condition the nozzle aperture 3 and water-repellant film aperture 8 are connected and ink can be jetted therefrom.

The optimal resist material 6 deposition condition is a condition in which the front edge surface of the resist material 6 is flush with the surface of the plate body 2. In this condition, the diameter of the jet aperture portion 5 of the nozzle aperture 3 and the diameter of the water-repellant film aperture 8 would be the same.

However, a problem arises with this conventional method using a resist material 6 in that the amount of resist material 6 deposited inside the nozzle aperture 3 by the resist material deposition process is difficult to control precisely, hence it is difficult to make the front edge surface of the resist material 6 flush with the surface of the plate body 2. If the front edge surface of the resist material 6 is not flush with the surface of the plate body 2, then the diameters of the jet aperture portion 5 of the nozzle aperture 3 and the diameter of the water-repellant film aperture 8 will not be identical and the ink jet will be difficult to control, adversely affecting the quality of the ink jet print.

SUMMARY OF THE INVENTION

It is an object of the present invention to provide a nozzle plate and a nozzle plate manufacturing method in which the amount of ink jetted can be accurately controlled, and in which the problems described above are eliminated.

The above-described object of the present invention is achieved by a nozzle plate comprising a plate body on which is formed a plurality of nozzle apertures each having a jet aperture portion from which ink is jetted and a water-repellant film formed on the plate body, wherein the diameter of each of the jet aperture portions formed on the plate body is identical to the diameter of each of a plurality of water-repellant film apertures formed on the water-repellant film so as to connect with the nozzle apertures. The water-repellant film may be formed from a resinous material.

The above-described object of the present invention is also achieved by a manufacturing method for a nozzle plate to be mounted on an ink jet print head, comprising the steps of (a) forming a water-repellant film on the plate body on which a nozzle aperture having a jet aperture portion from which ink is jetted is formed, and (b) forming on the water-repellant film a plurality of water-repellant film apertures each of the same diameter as the jet aperture portion by using the plate body to mask an area surrounding the nozzle aperture and using a removing means to remove such water-repellant film entering and remaining inside the nozzle apertures during formation of the water-repellant film.

The nozzle plate manufacturing method described above may further comprise the step of applying protective tape to a surface opposite the surface on which the plurality of jet aperture portions of the plate body are formed before forming the water-repellant film, where the step of forming the water-repellant film forms the water-repellant film by immersing the plate body in the water-repellant film material and the protective tape is removed once the forming of the water-repellant film has been completed, after which the water-repellant film apertures are formed.

According to the nozzle plate of the present invention, by making the diameter of the jet aperture portion from which ink is jetted the same as the diameter of the water-repellant film aperture formed on the water-repellant film, the ink meniscus prior to jetting the ink maintains the same position. Specifically, the meniscus is formed at the interface between the plate body within the nozzle aperture and the water-repellant film.

By maintaining the meniscus at the same position in this manner it is no longer necessary to take into consideration the effect of fluctuations in the position of the meniscus when controlling the ink jet as in the conventional art, making it possible to easily control the ink jet. In addition, in this manner it is possible to achieve stable ink jetting and hence it is possible to perform high-quality printing.

By forming the water-repellant film of the present invention from resinous material the water-repellant film acquires excellent workability, making it possible to easily make the diameters of the water-repellant film aperture and the nozzle aperture the same.

According to the water-repellant film forming process of the nozzle plate manufacturing method of the present invention, by forming the water-repellant film on the plate body on which the nozzle aperture is formed and then forming the water-repellant film aperture and removing the water-repellant film remaining inside the nozzle aperture of which the surrounding area is masked by the plate body to form the water-repellant film aperture, the diameter of the water-repellant film aperture formed and the diameter of the jet aperture portion become the same.

In addition, in contrast to the conventional manufacturing method using a resist, with the nozzle plate manufacturing method of the present invention there is no need to control the resist processing conditions. As a result, it is possible to easily form a water-repellant film aperture of the same diameter as the jet aperture portion.

According to the nozzle plate manufacturing method of the present invention, by using either an excimer laser device, a carbon dioxide gas laser device, a carbon dioxide gas pulse laser device or a water jet device as the removing means the water-repellant film is removed by laser device light or by water jet, making it possible to easily and accurately remove the water-repellant film remaining inside the nozzle aperture compared to mechanical removal processes.

Particularly when using a carbon dioxide gas laser device as the removing means, the heat generated by the carbon dioxide gas pulse laser during operation causes the portion of the water-repellant film being worked to melt and to thereafter harden again, thus forming a smooth water-repellant film on the nozzle aperture and making it possible to improve the ink flow.

In addition, by performing a step of applying protective tape to a surface opposite the surface on which the jet aperture portion of the plate body is formed before forming the water-repellant film the entire nozzle aperture except for the jet aperture portion is sealed.

With the nozzle aperture except for the jet aperture portion in this sealed condition the plate body is immersed in water-repellant film material to form the water-repellant film. At this point, excess water-repellant film material is prevented from getting inside the nozzle aperture because the nozzle aperture except for the jet aperture portion is sealed with protective tape. By preventing excess water-repellant film material from getting inside the nozzle aperture the amount of excess water-repellant film material that intrudes into the interior of the nozzle aperture can be reduced, making it possible to form the water-repellant film aperture more easily and more efficiently.

Other objects, features and advantages of the present invention will become more apparent from the following detailed description when read in conjunction with the accompanying drawings.

BRIEF DESCRIPTION OF THE DRAWINGS

FIG. 7 is a diagram showing the steps of the method of manufacturing a first embodiment of the nozzle plate of the present invention.

DESCRIPTION OF THE PREFERRED EMBODIMENTS

Figure 1:
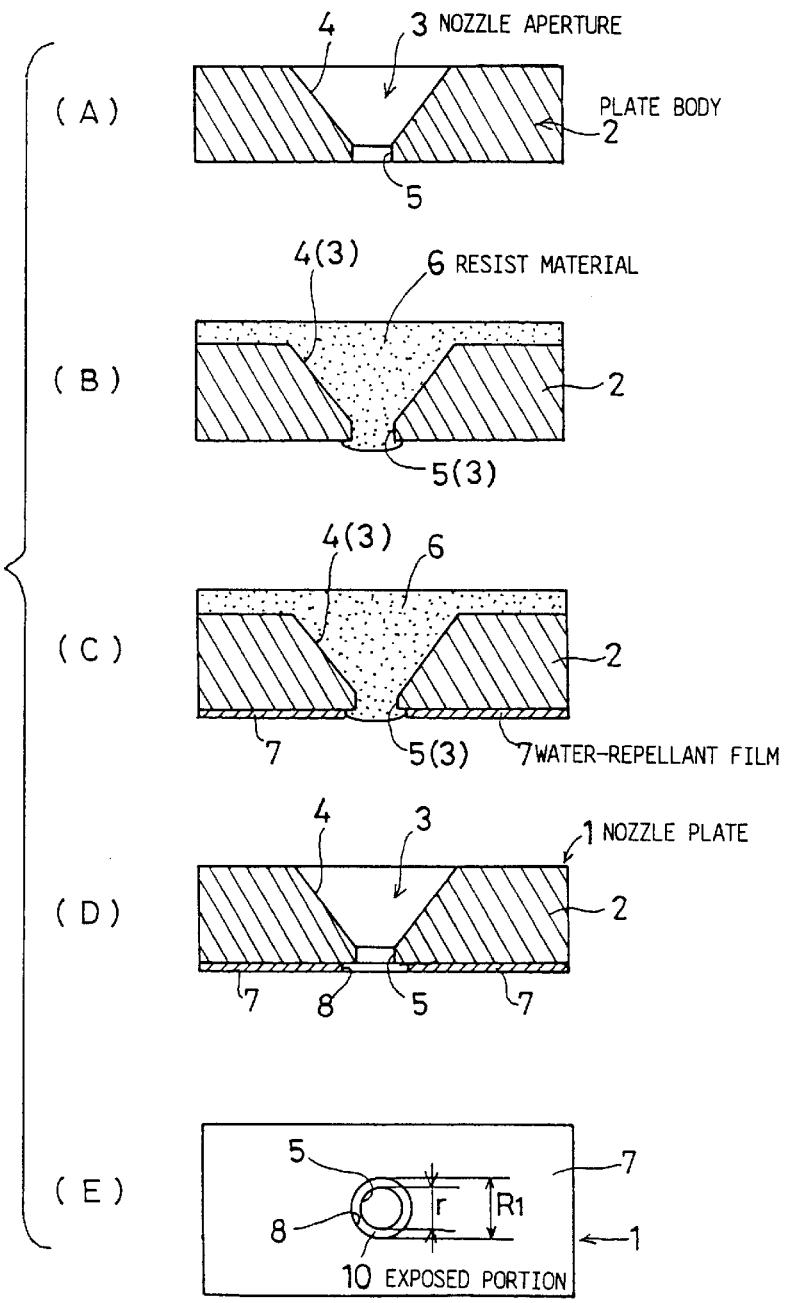
FIG. 1 is a first diagram for explaining an example of the conventional method of manufacturing a nozzle plate.

As noted previously, the conventional nozzle plate manufacturing method uses a deposition and removal of resist material to form the water-repellant film aperture. The optimal resist material deposition condition is a condition in which the front edge surface of the resist material is flush with the surface of the plate body. In this condition, the diameter of the jet aperture portion of the nozzle aperture and the diameter of the water-repellant film aperture would be the same.

However, as previously described, a problem arises with the conventional nozzle plate manufacturing method using a resist material 6, in that the amount of resist material 6 deposited inside the nozzle aperture 3 by the resist material deposition process is difficult to control precisely. As a result, it is difficult to make the front edge surface of the resist material 6 flush with the surface of the plate body 2. If the front edge surface of the resist material 6 is not flush with the surface of the plate body 2, then the diameters of the jet aperture portion 5 of the nozzle aperture 3 and the diameter of the water-repellant film aperture 8 will not be identical and the flow of the ink jet will be difficult to control, adversely affecting the quality of the ink jet print.

At some times, as shown in FIG. 1(B), the resist material 6 bulges outwardly beyond the surface of the plate body 2; at other times, as shown in FIG. 2(B) only enough resist material 6 is injected to form a recessed depression below the surface of the plate body 2.

Where the resist material 6 bulges outwardly beyond the surface of the plate body 2 as shown in FIG. 1(B), the diameter R1 of the water-repellant film aperture 8 formed on the water-repellant film 7 becomes larger than the diameter r of the jet aperture portion 5 of the nozzle aperture 3 (R1>r). At the same time, where only enough resist material 6 is injected to form a recessed depression below the surface of the plate body 2 as shown in FIG. 2(B), the diameter R2 of the water-repellant film aperture 8 formed on the water-repellant film 7 becomes smaller than the diameter r of the jet aperture portion 5 of the nozzle aperture 3 (R2<r).

As described above, where the diameter r of the jet aperture portion 5 and the diameter R1, R2 of the water-repellant aperture 8 do not match it becomes impossible to adjust the amount of jetted ink as appropriate, for reasons which will now be explained.

Figure 3A:
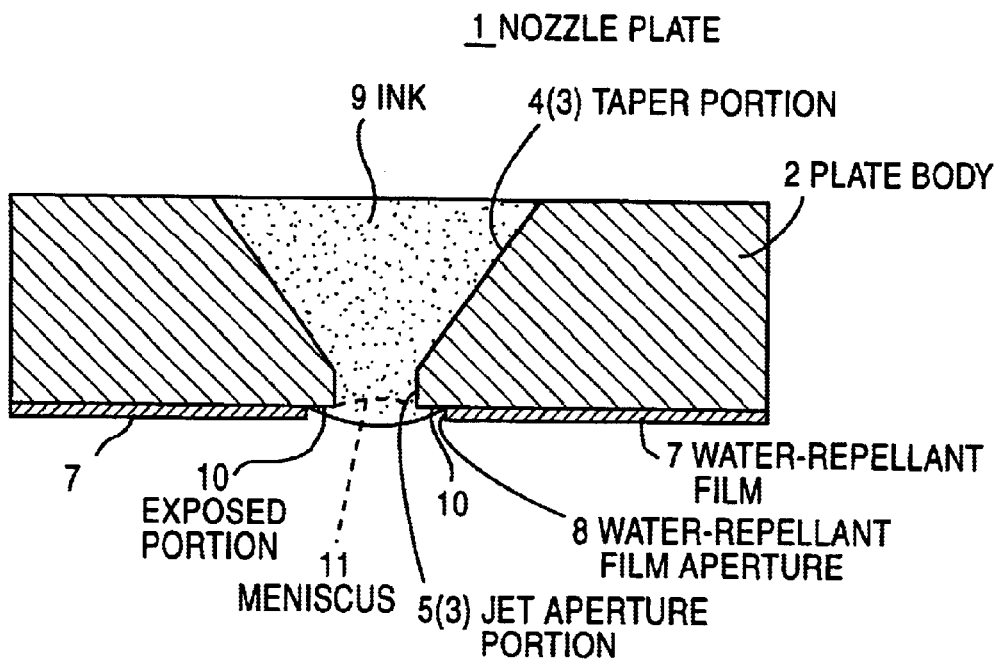
FIGS. 3(A) and 3(B) are first diagrams for explaining the problem with the conventional nozzle plate.
Figure 3B:
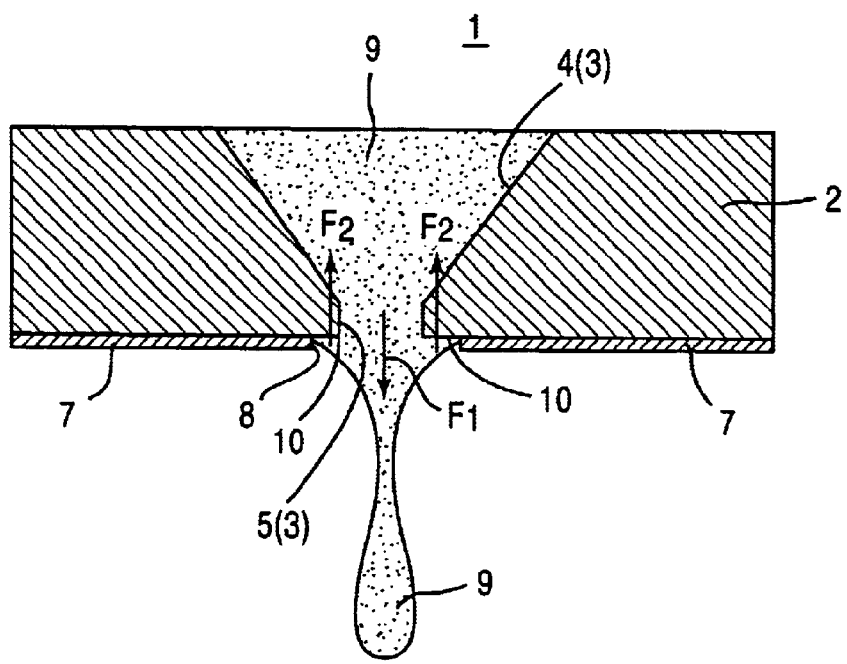

FIGS. 3(A) and 3(B) show a state in which ink 9 is jetted in a construction in which the diameter R1 of the water-repellant film aperture 8 is larger than the diameter r of the jet aperture portion 5 (R1>r). FIG. 3(A) shows a condition in which jetting has just begun, while FIG. 3(B) shows a condition during jetting.

Prior to jetting, an ink jet print head ink chamber (not shown) filled with ink 9 is depressurized and the interior of the nozzle aperture 3 connected to this ink chamber is also depressurized. This decompression causes the front edge surface (hereinafter referred to as a meniscus 11) of the ink 9 inside the jet aperture portion 5 to assume a condition in which it withdraws inward in a curve due to surface tension, as shown by the dotted line in FIG. 3(A).

When jetting has been commenced a piezoelectric element (not shown) provided on the ink chamber is driven, the volume of the interior of the ink chamber contracts and the ink is compressed. As a result, the ink 9 inside the nozzle aperture 3 is expelled outwards from the jet aperture portion 5 (onto, for example, a recording paper).

However, when the diameter R1 of the water-repellant film aperture 8 is larger than the diameter r of the jet aperture portion 5 (R1>r), no water-repellant film 7 is deposited on a peripheral edge portion of the jet aperture portion 5. That is, an exposed portion 10, in which the plate body 2 is in an exposed condition, exists (see FIG. 1(E)). This exposed portion 10 (plate body 2) is hydrophilic with respect to the ink 9, so the ink 9 jetted from the jet aperture portion 5 first attaches to the exposed portion 10 as shown in FIG. 3(A).

Then, as the ink 9 is further expelled outwards, the ink 9 is jetted onto the recording paper as shown in FIG. 3(B). At this point, if the force with which the ink is jetted onto the recording paper is F1, then a force F2 with which the expulsion of the ink 9 is resisted by surface tension at the above-described exposed portion 10 is created. Hereinafter this force F2 is referred to as the jet obstruction force.

As a result, it becomes necessary to take this jet obstruction force F2 into consideration when driveably controlling the piezo-electric element to control the jet amount. This jet obstruction force F2 correlates with the surface area of the exposed portion 10 but, as explained using FIG. 1(B) and FIG. 1(C), the surface area of the exposed portion 10 is determined by the amount of resist material 6 projecting from the jet aperture portion 5.

It is difficult to predict with accuracy what this projecting amount will be, however, and as a result it is difficult to driveably control the piezo-electric element to control the jet amount. Thus, with a nozzle plate of a construction like that shown in FIGS. 1 and 3, there is the problem that it is difficult to expel only a desired predetermined jet amount of ink 9.

Figure 4:
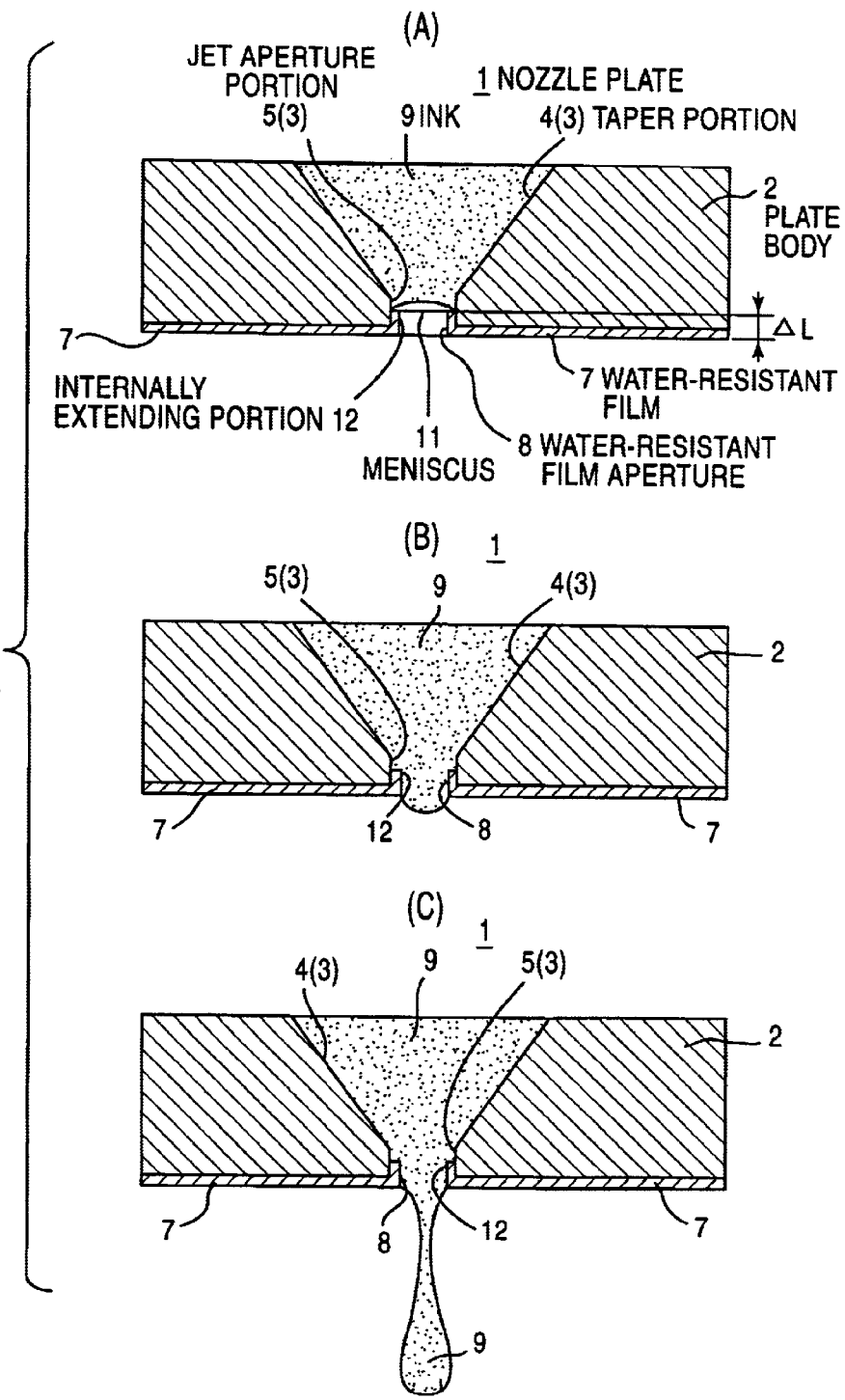
FIG. 4 is a first diagram for explaining the problem with the conventional nozzle plate.

On the other hand, FIG. 4 shows a state in which ink is jetted in a construction in which the diameter R2 of a water-repellant film aperture 8 is smaller than the diameter r of the jet aperture portion 5 (R2<r). FIG. 4(A) shows a condition prior to commencing jetting, FIG. 4(B) shows a condition just after commencing jetting and FIG. 4(C) shows a condition during jetting.

Where the diameter R2 of the water-repellant film aperture 8 is smaller than the diameter r of the jet aperture portion 5 (R2<r), during the water-repellant film formation process the water-repellant film 7 gets inside the jet aperture portion 5 and forms an internally extending portion 12. As a result, a condition arises in which the meniscus 11 of the ink 9 is formed further inside the jet aperture portion 5 than the internally extending portion 12 as shown in FIG. 4(A). That is, a condition arises in which the meniscus 11 is positioned further inside the ink jet position of the nozzle plate 1 at the ΔL arrows in the drawing.

When in this condition jetting is commenced, the piezoelectric element provided on the ink chamber is driven and the ink 9 compressed, as noted previously the ink 9 inside the nozzle aperture 3 is expelled outward from the jet aperture portion 5 onto, for example, a recording paper. However, as noted above the diameter R2 of the water-repellant film aperture 8 is smaller than the diameter r of the jet aperture portion 5 (R2<r) and so the ink 9 advances beyond the part shown by the ΔL arrows in the drawing to assume the condition shown in FIG. 4(B), after which it is expelled outwards as shown in FIG. 4(C).

As a result, it becomes necessary to take into consideration the amount of ink required to advance beyond the part shown by these ΔL arrows in the drawing when driveably controlling the piezo-electric element to control the jet amount. This dimension ΔL is equivalent to the formation range of the internally extending portion 12, so if this internally extending portion 12 is known then it is possible to reflect that fact in the jet amount control. However, the formation range of the internally extending portion 12 is determined by the amount of resist material 6 projecting from the front edge of the jet aperture portion 5, and it is difficult to predict with accuracy what this projecting amount will be.

Figure 2:
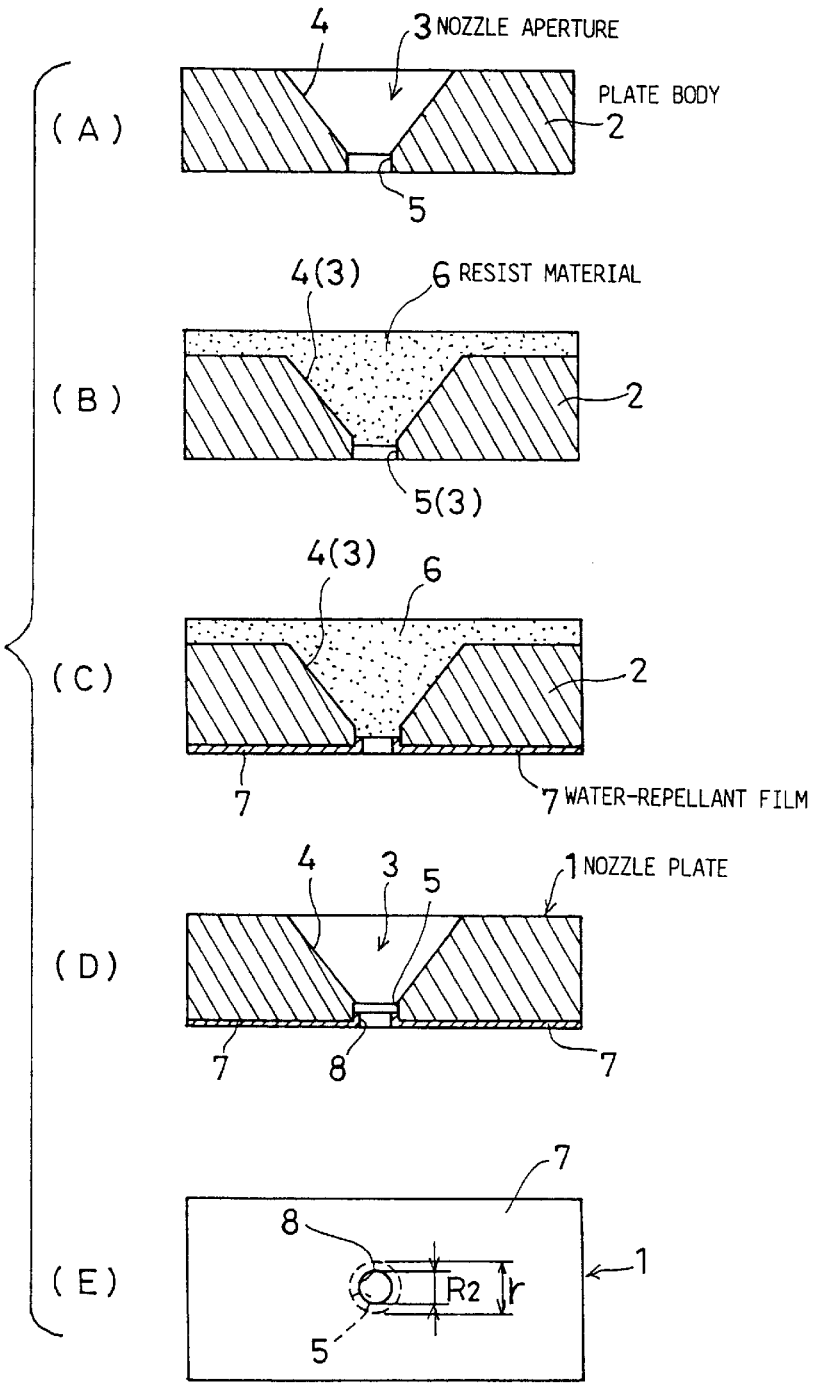
FIG. 2 is a second diagram for explaining an example of the conventional method of manufacturing a nozzle plate.

As a result, it is difficult to take into consideration the amount of ink required to advance beyond the part shown by these ΔL arrows in the drawing when driveably controlling the piezoelectric element to control the jet amount, and even with the nozzle plate 1 of the construction shown in FIGS. 2 and 4 there is the problem that it is difficult to expel only a desired predetermined jet amount of ink 9.

A description will now be given of the preferred embodiments of the present invention in which the problems described above are eliminated, with reference to the accompanying drawings.

Figure 5:
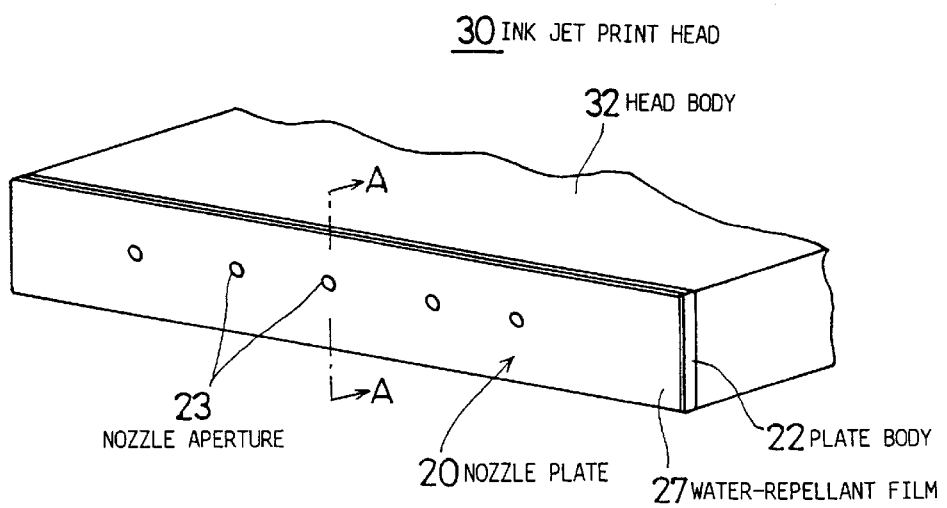
FIG. 5 shows an oblique view of an ink jet print head mounting a first embodiment of a nozzle plate according to the present invention.
Figure 6:
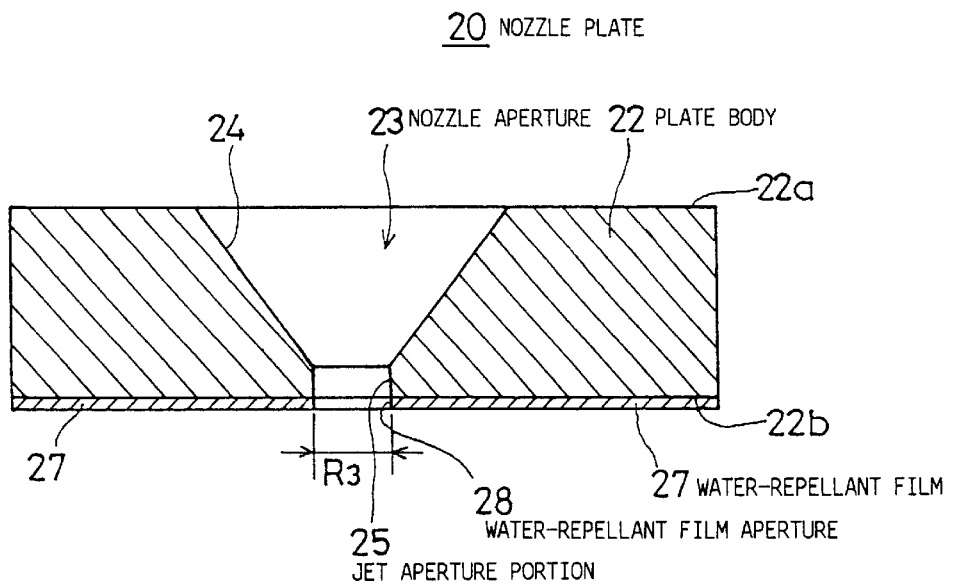
FIG. 6 shows a cross-sectional view of a first embodiment of a nozzle plate according to the present invention.

FIG. 5 and FIG. 6 show a nozzle plate 20 of a first embodiment of the present invention. FIG. 5 shows an ink jet print head 30 provided with a nozzle plate 20 and FIG. 6 shows a cross-sectional view of a nozzle plate 20 (along the line A—A shown in FIG. 5).

As shown in FIG. 5 the nozzle plate 20 is a plate-like member provided on the front surface of a plate body 22, which is itself provided on the front surface of an ink jet print head body 32. A plurality of nozzles 23 are formed on the surface of the nozzle plate 20. The ink jet print head body 32 is provided internally with an ink chamber and a piezoelectric element, neither of which is shown in the drawing, and is configured so that by driving the piezo-electric element the volume of the interior of the ink chamber is compressed and ink 29 filling the interior of the ink chamber is expelled from the nozzle apertures 23.

A detailed description will now be given of the nozzle plate 20 by referring to FIG. 6. Briefly, nozzle plate 20 comprises the plate body 22 and water-repellant film 27. The plate body 22 is a metal plate made, for example, of stainless steel (SUS), on which a nozzle aperture 23 is formed. An inner surface 22a of this plate body 22 is connected to the ink jet print head body 32 and the water-repellant film 27 is formed so as to cover a front surface 22b.

The nozzle aperture 23 is configured so as to continuously connect the taper portion 24 and the jet aperture portion 25. In a condition in which the nozzle plate 20 is attached to the ink jet print head body 32, the inner surface 22a of the taper portion 24 is connected to the ink chamber of the ink jet print head body 32. As a result, the ink 29 inside the ink chamber fills this aperture 23 as well.

The jet aperture portion 25 is a small hole through which the ink 29 is expelled outwards, having a predetermined diameter R3 appropriate for jetting ink. The nozzle aperture 23 having this taper portion 24 and jet aperture portion 25 can be formed by a mechanical process or by an etching process, while the plate body 22 itself is hydrophilic in character.

By contrast, the water-repellant film 27 is made of a resin (for example a fluororesin material or a polyimide resin material) having water-repellant qualities that repel the ink 29 and is formed to a predetermined thickness on a front surface 22b of the plate body 22. This water-repellant film 27 repels the ink 29, which improves the flow of the ink 29 when jetted and serves the function of improving the performance of the ink jet print head.

The water-repellant film aperture 28 is formed at a position on the water-repellant film 27 opposite the jet aperture portion 25. In the present embodiment, the diameter of this water-repellant film aperture 28 formed on the water-repellant film 27 is the same as the diameter of the jet aperture portion 25. That is, the diameter of the water-repellant film aperture 28 and the diameter of the jet aperture portion 25 are such that they are both of a diameter R3.

Thus, by making the diameter of the water-repellant film aperture the same as the diameter of the jet aperture portion, the ink 29 meniscus prior to jetting the ink maintains the same position and it is possible to achieve stable ink jetting. For convenience, a detailed discussion of this point will be deferred until later.

Next, a description will be given of the method of manufacturing the above-configured nozzle plate 20 by referring to FIG. 7, which shows the steps of the method of manufacturing a first embodiment of the nozzle plate of the present invention.

In the manufacture of the nozzle plate 20, the plate body 22 shown in FIG. 7 must be made first. As explained previously, the plate body 22 is made of, for example, stainless steel (SUS) and comprises a nozzle aperture 23 having a taper portion 24 as well as a jet aperture portion 25 formed by using a mechanical process or an etching process.

As shown next in FIG. 7(B), after the above-configured plate body 22 is formed protective tape 26 is applied to the inner surface 22a at a position opposite the position on the front surface 22b of the plate body 22 on which the jet aperture portion 25 is formed (the protective tape application process).

Provided this protective tape 26 is of a type that is easily removed after the formation of the water-repellant film 27 discussed hereafter, the material from which it is made need not be limited to any particular type. Specifically, a resin tape coated with a removable adhesive may be used. As explained previously, by applying protective tape to an inner surface 22a during the protective taping process the entire nozzle aperture 23 except for the jet aperture portion 25 is sealed.

When the process of applying protective tape is finished, the process of forming the water-repellant film is begun. This process of forming the water-repellant film involves soaking the front surface 22b of the plate body 22 in a tank filled with water-repellant film material. In this manner a water-repellant film 27 is formed on the front surface 22b of the plate body 22. FIG. 7(C) shows a plate body 22 on which a water-repellant film 27 has been formed.

As explained previously, protective tape 26 is not applied to the jet aperture portion 25 of the nozzle aperture 23, which thus remains in an externally open condition. Thus, when the front surface 22b of the plate body 22 is immersed in the tank filled with water-repellant film material the water-repellant film 27 gets inside the jet aperture portion 25 and forms an internally extending portion (hereinafter this water-repellant film 27 formed inside the jet aperture portion 25 is referred to as an aperture-internal extending portion 33).

However, as explained previously, except for the jet aperture portion 25 the nozzle aperture 23 is sealed by the protective tape 26. Thus, when the plate body 22 is immersed in the tank filled with water-repellant film 27 the air remaining inside the nozzle aperture 23 has no way of escaping and serves the function of preventing the water-repellant film 27 from getting inside the nozzle aperture 23.

In this manner the intrusion of excess water-repellant film material into the interior of the nozzle aperture 23 can be prevented and the volume of the aperture-internal extending portion 33 can be reduced. Specifically, a condition is achieved in which the aperture-internal extending portion 33 comes to reside only inside the jet aperture portion 25 of the nozzle aperture 23 (see FIG. 7(C)).

When the process of forming the water-repellant film is finished, the protective tape 26 is removed and the process of forming the water-repellant film aperture is begun. This process involves using the nozzle plate 20 as a mask in order to remove the aperture-internal extending portion 33 remaining inside the nozzle aperture 23 by using a removing means.

Either an excimer laser device, a carbon dioxide gas laser device, a carbon dioxide gas pulse laser device or a water jet device may be used as the removing means. In the present embodiment a carbon dioxide gas pulse laser device is used as the removing means.

As shown in FIG. 7(D), the carbon dioxide gas pulse laser device is configured so that it radiates laser beams toward the inner surface 22a of the plate body plate body plate body 22, in such a way that the laser beams do not irradiate the entire water-repellant film 27 but are blocked by the plate body 22 so that the laser beams irradiate only the aperture-internal extending 33 remaining inside the nozzle aperture 23. Thus the aperture-internal extending portion 33 is removed and a water-repellant film aperture 28 connected to the jet aperture portion 25 is formed on the water-repellant film 27. In this manner, as shown in FIG. 7(D) and (E) the nozzle plate 20 is produced.

Moreover, when the water-repellant film aperture 28 is formed by this method it acquires a diameter R3 that is identical to the diameter of the jet aperture portion 25. For this reason the above-described method of forming the water-repellant film aperture 28 eliminates the need to control the resist processing conditions of the conventional manufacturing method using a resist as described using FIG. 1 and FIG. 2. As a result, it is possible to easily form a water-repellant film aperture of the same diameter as the jet aperture portion.

Similarly, the use of protective tape 26 reduces the amount of excess water-repellant film material that intrudes into the interior of the nozzle aperture 23, making it possible to form the water-repellant film aperture 28 more easily and more efficiently.

The present embodiment uses a resinous material as the water-repellant film 27, thus improving the ease with which the water-repellant film 27 (the aperture-internal extending portion 33) can be worked by the carbon dioxide gas pulse laser device and making it easier to make the water-repellant film aperture 28 and the jet aperture portion 25 have the same diameter.

In addition, although the present embodiment was described using a carbon dioxide gas pulse laser device as the removing means it is also possible to use an excimer laser device, a carbon dioxide gas laser device or a water jet device as the removing means. Even when using any one of these other devices as the removing means it is still possible to easily and accurately remove the water-repellant film remaining inside the nozzle aperture as compared to mechanical removal processes.

In addition, where a carbon dioxide gas pulse laser is used as the removing means as in the present embodiment, the heat generated by the carbon dioxide gas pulse laser during operation causes the portion of the water-repellant film 27 being worked to melt and to thereafter harden again, thus forming a smooth water-repellant film 27 on the nozzle aperture 23 and making it possible to improve the ink flow.

Moreover, by making the diameter of the water-repellant film aperture 28 formed on the nozzle plate 20 the same as the diameter of the jet aperture portion 25 as noted above, it is possible to achieve stable ink jetting. A description will now be given as to the reason for this, by referring to FIG. 8.

Figure 8A:
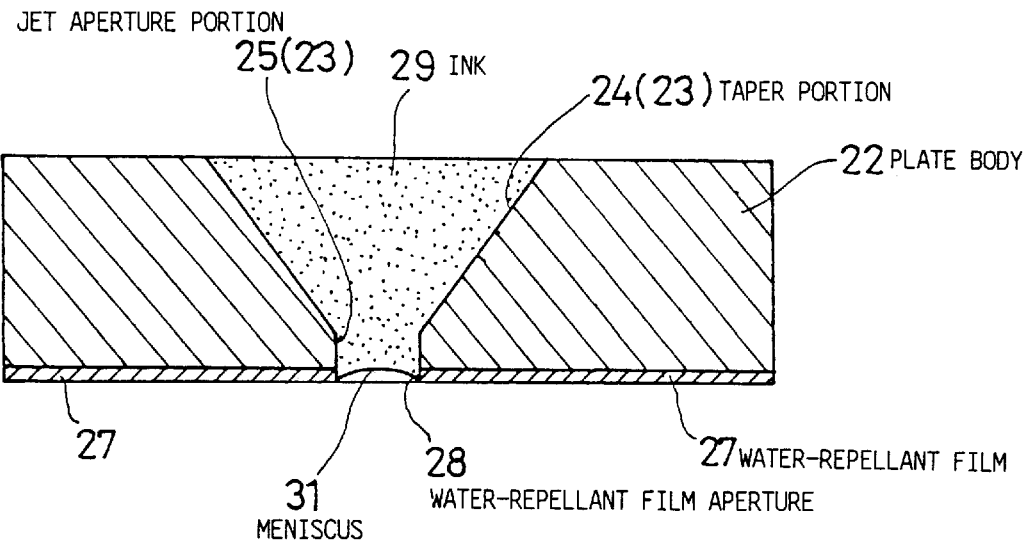
FIG. 8 is a diagram for explaining the action of a first embodiment of the nozzle plate of the present invention during ink jetting.

FIG. 8(A) shows the nozzle plate 20 shown in FIG. 6, in a condition prior to the jetting of the ink 29. In this condition the ink chamber filled with ink 29 of the ink jet print head 30 (see FIG. 5) is depressurized, depressurizing the interior of the nozzle aperture 23 connected to this ink chamber and causing the meniscus 31 of the ink 29 inside the jet aperture portion 25 to withdraw inward in a curve due to surface tension. If as in the present embodiment the diameter of the water-repellant film aperture 28 and the diameter of the jet aperture portion 25 are the same, then the meniscus 31 will be formed at the interface between the plate body 22 within the nozzle aperture 23 and the water-repellant film 27. The meniscus is formed at this interface because the ink 29 is attracted by the hydrophilic properties of the jet aperture portion 25 that comprises one portion of the plate body 22 and repelled by the water-repellant film aperture 28. Thus the meniscus is always formed at the interface between the plate body 22 and the water-repellant film aperture 28.

Figure 8B:
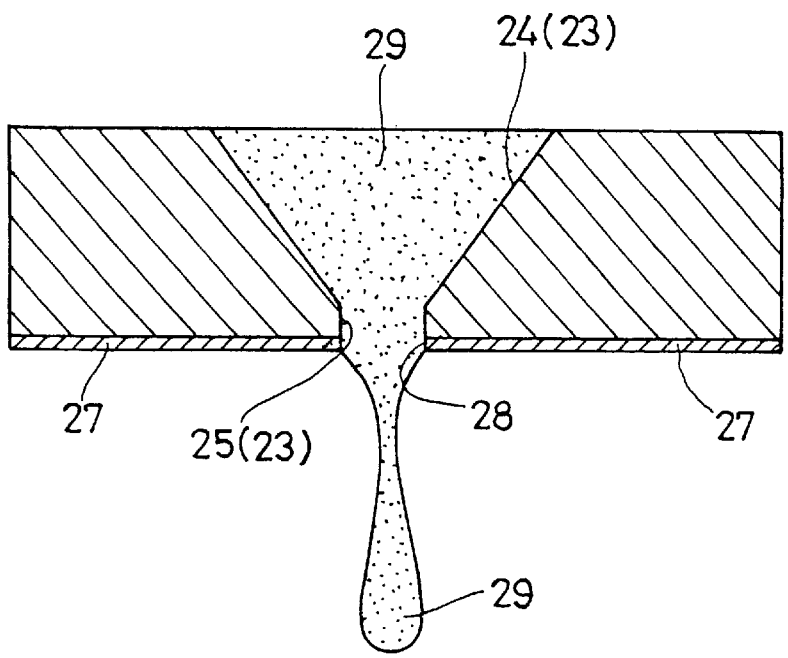

When the jetting of the ink 29 commences from the condition shown in FIG. 8A, a piezo-electric element provide on the ink chamber is driven, the volume of the interior of the ink chamber contracts and the ink 29 is thereby compressed. As a result, the ink 29 inside the nozzle aperture 3 is expelled outwards from the jet aperture portion 25 onto, for example, a recording paper as shown in FIG. 8(B).

As explained previously, by using the nozzle plate 20 of the present embodiment when ink jetting the position of the meniscus remains the same. As a result, it is no longer necessary to take into consideration the effect of fluctuations in the position of the meniscus when controlling the ink jet. Specifically, it is no longer necessary to take into consideration the jet obstruction force F2 described by reference to FIG. 3 when driveably controlling the piezo-electric element, and it is no longer necessary to take into consideration the amount of ink required to advance beyond the part shown by ΔL arrows described by reference to FIG. 4.

As a result, since the diameter of the water-repellant film aperture 28 formed on the nozzle plate 20 is the same as the diameter of the jet aperture portion 25, the nozzle plate 20 is thus configured so that the meniscus 31 is formed at the same location inside the nozzle aperture 23.

According to the embodiment described above, since the meniscus 31 is always formed at the same position prior to ink jetting it is no longer necessary to take into consideration the effect of fluctuations in the position of the meniscus when controlling the ink jet. As a result, it becomes possible to easily control the ink jet and hence it also becomes possible to achieve stable ink jetting and to perform high-quality printing.

Additionally, in the embodiment described above, since the water-repellant film is made from a resinous material the water-repellant film acquires excellent workability, making it possible to easily make the diameters of the water-repellant film aperture and the nozzle aperture the same.

Moreover, the nozzle plate manufacturing method of the embodiment described above makes it possible to easily form a water-repellant film aperture having a diameter that is the same as the diameter of the jet aperture portion.

Additionally, the use of a laser device or water jet device as a removing means in the nozzle plate manufacturing method of the embodiment described above makes it possible to easily and accurately remove the water-repellant film covering the nozzle aperture using the nozzle plate as a mask as compared to mechanical removal processes.

Moreover, by applying protective tape to a surface opposite the surface on which the jet aperture portion of the plate body is formed before forming the water-repellant film, the nozzle plate manufacturing method of the present embodiment reduces the amount of water-repellant material that intrudes into the interior of the nozzle aperture making it possible to form the water-repellant film aperture more easily and more efficiently.

Further, the present invention is not limited to these specifically disclosed embodiments, and variations and modifications may be made without departing from the scope of the present invention.

The present application is based on Japanese priority application No. 10-211428 filed on Jul. 27, 1998, the entire contents of which are hereby incorporated by reference.

What is claimed is:

1. A manufacturing method for a nozzle plate to be mounted on an ink jet print head, comprising the steps of:

providing a plate body on which a plurality of nozzle apertures are formed, each of said nozzle apertures having a jet aperture portion from which ink is jetted;

forming a resinous water-repellant film only on the side of said body through which said jet aperture portion of said nozzle apertures extend;

applying a water jet to said nozzle apertures from a water jet device positioned on the side of said plate body opposite said side of said body containing said water-repellant film to form in said water-repellant film a plurality of water-repellant film apertures, each of said water-repellant film apertures having a diameter identical to that of said jet aperture portions such that stable ink jetting is achieved, by using said plate body to mask an area surrounding said nozzle apertures; and removing water-repellant film entering and remaining inside said jet aperture portion of said nozzle apertures during the film forming step.

2. The nozzle plate manufacturing method as claimed in claim 1, comprising the further steps of:

applying protective tape to a surface opposite the surface on which said jet aperture portion of said plate body is formed before forming said water-repellant film;

immersing said plate body in a water-repellant film material; and removing said protective tape, thereby forming said water-repellant film apertures.

3. The manufacturing method as claimed in claim 1, wherein said plate body is made of metal.

* * * * *